United States Patent
Lee et al.

(10) Patent No.: US 7,656,834 B2
(45) Date of Patent: *Feb. 2, 2010

(54) DISCONTINUOUSLY TRANSMITTING AND RECEIVING MULTIMEDIA BROADCAST/MULTICAST SERVICE DATA IN MOBILE COMMUNICATION SYSTEM

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 998 days.

This patent is subject to a terminal disclaimer.

(21) Appl. No.: 11/050,042

(22) Filed: Feb. 1, 2005

(65) Prior Publication Data

US 2005/0190712 A1    Sep. 1, 2005

(30) Foreign Application Priority Data

Feb. 11, 2004    (KR) .................. 10-2004-0009130

(51) Int. Cl.
*H04H 20/71*    (2008.01)
(52) U.S. Cl. ....................... 370/312; 370/328
(58) Field of Classification Search .......... None
See application file for complete search history.

(56) References Cited

U.S. PATENT DOCUMENTS

| | | | |
|---|---|---|---|
| 7,436,764 B2 * | 10/2008 | Lee et al. ............. | 370/229 |
| 2002/0038340 A1 | 3/2002 | Whipple et al. | |
| 2003/0174678 A1 | 9/2003 | Chang et al. | |
| 2003/0211855 A1 * | 11/2003 | Sarkkinen et al. ......... | 455/466 |
| 2005/0066034 A1 | 3/2005 | Beckmann | |

FOREIGN PATENT DOCUMENTS

| | | |
|---|---|---|
| EP | 1 006 740 A2 | 7/2000 |
| EP | 1 283 652 A1 | 2/2003 |
| EP | 1283652 | 2/2003 |
| EP | 1714466 | 1/2008 |
| EP | 1174406 | 2/2008 |
| IN | 486/KOL/2004 | 5/2006 |
| RU | 2157598 | 10/2000 |
| WO | WO 03/015439 A1 | 2/2003 |
| WO | WO 03/036871 A1 | 5/2003 |
| WO | WO 03/049005 | 6/2003 |
| WO | WO 2004/017540 A1 | 2/2004 |

OTHER PUBLICATIONS

"3rd Generation Partnership Project: MTCH Discontinuous Transmission and Reception; TSG-RAN Working Group 2#41; R2-040415" Malaga, Spain, Feb. 16-20, 2004 [retrieved on May 11, 2005]. Retrieved from the Internet: ,URL:http://www.3gpp.org/ftp/TSG_RAN/WG2_RL2/TSGR2_41/Docs/> the whole document.

* cited by examiner

*Primary Examiner*—Philip J Sobutka
(74) *Attorney, Agent, or Firm*—Lee, Hong, Degerman, Kang & Waimey

(57) ABSTRACT

Discontinuous transmission and reception of point-to-multipoint service data between a network and a mobile terminal is achieved by transmitting scheduling information from the network to the mobile terminal via a first common channel. The mobile terminal determines a time for receiving the service data in response to the scheduling information and discontinuously receives the service data through a second common channel.

50 Claims, 5 Drawing Sheets

US 7,656,834 B2

DISCONTINUOUSLY TRANSMITTING AND RECEIVING MULTIMEDIA BROADCAST/MULTICAST SERVICE DATA IN MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0009130, filed on Feb. 11, 2004, the contents of which is hereby incorporated by reference herein in its entirety.

BACKGROUND OF THE INVENTION

1. Field of the Invention

The present invention relates to a multimedia broadcast/multicast broadcast service (MBMS) in a mobile communication system and, more particularly, to discontinuously transmitting and receiving MBMS data between a network and a mobile terminal.

2. Description of the Related Art

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access technologies.

A related art UMTS network structure 1 is illustrated in FIG. 1. A mobile terminal, or user equipment (UE), is connected to a core network (CN) through a UMTS terrestrial radio access network (UTRAN). The UTRAN configures, maintains, and manages a radio access bearer for communications between the UE 2 and the core network to meet end-to-end quality of service requirements.

The UTRAN includes a plurality of radio network subsystems (RNS), each of which comprises one radio network controller (RNC) for a plurality of base stations, or "Node Bs." The RNC connected to a given base station is the controlling RNC for allocating and managing the common resources provided for any number of UEs operating in one cell. One or more cells exist in one Node B. The controlling RNC controls traffic load, cell congestion, and the acceptance of new radio links. Each Node B may receive an uplink signal from a UE and may transmit downlink signals to the UE. Each Node B serves as an access point enabling a UE to connect to the UTRAN, while an RNC serves as an access point for connecting the corresponding Node Bs to the core network.

Among the radio network subsystems of the UTRAN, the serving RNC is the RNC managing dedicated radio resources for the provision of services to a specific UE and is the access point to the core network for data transfer to the specific UE. All other RNCs connected to the UE are drift RNCs, such that there is only one serving RNC connecting the UE to the core network via the UTRAN. The drift RNCs facilitate the routing of user data and allocate codes as common resources.

The interface between the UE and the UTRAN is realized through a radio interface protocol established in accordance with radio access network specifications describing a physical layer (L1), a data link layer (L2) and a network layer (L3) described in, for example 3GPP specifications. These layers are based on the lower three layers of an open system interconnection (OSI) model that is a well-known in the art of communication systems. A related art architecture of the radio interface protocol is illustrated in FIG. 2. As shown, the radio interface protocol is divided horizontally into the physical layer, the data link layer, and the network layer, and is divided vertically into a user plane for carrying data traffic such as voice signals and Internet protocol packet transmissions and a control plane for carrying control information for the maintenance and management off the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (transmitter).

The MAC layer of the second layer provides a service to an upper layer of a radio link control (RLC) layer through a logical channel. The RLC layer provides support for reliable data transmissions, and may perform a function of segmentation and concatenation of an RLC service data unit (SDU) coming from an upper layer.

The radio resource control (RRC) layer located at the lowest portion of the third layer (L3) is only defined in the control plane and controls transport channels and physical channels with respect to the establishment, re-establishment, and releasing of radio bearers. A radio bearer (RB) is a service provided by a lower layer, such as the RLC layer or the MAC layer, for transferring data between the UE and the UTRAN and guaranteeing a predetermined quality of service between the UE and the UTRAN.

The establishment of an RB determines regulating characteristics of the protocol layer and channel needed to provide a specific service, thereby establishing the parameters and operational methods of the service. When a connection is established to allow transmission between an RRC layer of a specific UE and an RRC layer of the UTRAN, the UE is said to be in the RRC-connected state. Without such connection, the UE is in an idle state.

A UTRAN RRC layer requests one or more measurements from a terminal (UE) RRC in order to control a radio bearer. For example, the UTRAN RRC layer requests the UE RRC to measure power of a channel transmitted in a specific cell or to measure power of a channel transmitted from a specific frequency.

Hereafter, a Multimedia Broadcast/Multicast Service (MBMS or "MBMS service") will be described. MBMS refers to a method of providing streaming or background services to a plurality of UEs using an MBMS radio bearer that utilizes at least one of point-to-multipoint and point-to-point radio bearers. One MBMS service includes one or more sessions and MBMS data is transmitted to the plurality of terminals through the MBMS radio bearer only while the session is ongoing. Here, a session is a time period during which particular data is sent by the network.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

The UTRAN provides the MBMS service to a plurality of UEs by using the RB. RBs used by the UTRAN can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel). Alternatively, the point-to-point RB may include the DTCH, a transport channel FACH (Forward Access Channel) and a physical channel SCCPCH (Secondary Common Control Physical Channel).

The point-to-multipoint RB is a unidirectional downlink RB, including a logical channel MTCH (MBMS Traffic Channel), a transport channel FACH (Forward Access Channel), and the physical channel SCCPCH. The logical channel MTCH is configured for each MBMS service provided to one cell and is used to transmit user plane data of a specific MBMS service to the UEs.

The UTRAN providing the MBMS service transmits a control message, namely, an MBMS-related RRC message to the plurality of terminals (UEs) through an MCCH (MBMS Control Channel). The MBMS-related control message includes a message providing MBMS service information and a message providing point-to-multipoint RB information. As shown in FIG. 3, the logical channel MCCH is the point-to-multipoint downlink channel and is mapped to the FACH, which is mapped to the SCCPCH. Only one MCCH exists in one cell.

Accordingly, when a terminal wants to receive a specific MBMS service using the point-to-multipoint RB, it receives an RRC message including RB information through the MCCH and sets a point-to-multipoint RB using the RB information. After the point-to-multipoint RB is set, the terminal continuously receives a physical channel SCCPCH, to which an MTCH is mapped, to obtain specific MBMS service data transmitted through the MTCH.

However, in the related art, because the terminal cannot recognize when the MBMS data is transmitted through the MTCH during a session, i.e., the exact MBMS data transmission time, the terminal must continuously receive the SCCPCH to which the MTCH is mapped during the session. Thus, the terminal is unable to perform other operations such as measuring a channel of a different cell during the session. In addition, when the terminal does perform the measurement operation, it cannot receive the MBMS data transmitted during the measurement operation.

SUMMARY OF THE INVENTION

The present invention is directed to a method for discontinuously transmitting and receiving MBMS data between a wireless system and a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a point-to-multipoint service in a mobile terminal of a mobile communication system, the method comprising receiving scheduling information from a network for discontinuously receiving point-to-multipoint service data, wherein the scheduling information is provided via a first common channel to a plurality of mobile terminals subscribing to the point-to-multipoint service, determining a time for receiving the point-to-multipoint service data in response to the scheduling information, and discontinuously receiving the point-to-multipoint service data in the mobile terminal through a second common channel.

The first common channel and the second common channel are mapped onto a common physical channel. The scheduling information comprises information associated with another common traffic logical channel mapped to the common physical channel. The scheduling information may also comprise information associated with another point-to-multipoint service data transmitted through the common physical channel. The first common channel comprises a common control logical channel. The second common channel comprises a common traffic logical channel.

In one embodiment of the present invention, the scheduling information is received periodically, wherein the mobile terminal receives period information for receiving the scheduling information through a third common channel. Furthermore, the scheduling information is received during discontinued transmission of the point-to-multipoint service data.

In another embodiment of the invention, the scheduling information is received non-periodically, wherein the mobile terminal receives information related to when the next scheduling information is transmitted through the first common channel. Moreover, the scheduling information is received during discontinued transmission of the point-to-multipoint service data.

In another aspect of the invention, the scheduling information comprises information associated with discontinued transmission of the point-to-multipoint service data, wherein the mobile terminal suspends receiving the point-to-multipoint service data for a period associated with the scheduling information.

Alternatively, the scheduling information comprises information associated with continued transmission of the point-to-multipoint service data, wherein the mobile terminal receives the point-to-multipoint service data for a period associated with the scheduling information.

The scheduling information may further comprise information associated with a start time of the continued transmission of the point-to-multipoint service data, wherein the mobile terminal receives the point-to-multipoint service data from the start time for a period associated with the scheduling information.

In a detailed aspect of the invention, the scheduling information comprises a service identifier for identifying the point-to-multipoint service. The scheduling information may also comprise an identifier for identifying the second common channel. The second common channel is configured in response to information transmitted through a third common channel.

In another aspect, the method further comprises selectively receiving the scheduling information according to a scheduling information mode and receiving a mode indicator for indicating the scheduling information mode, wherein the scheduling information mode comprises at least one of receiving the scheduling information once during discontinued reception of the point-to-multipoint service data, receiving the scheduling information periodically during discontinued reception of the point-to multipoint service data, and receiving the scheduling information non-periodically during discontinued reception of the point-to-multipoint service data. Preferably, the mode indicator is received through at least one of the first common channel, a third common channel using a point-to-multipoint RRC message, and a fourth common channel using system information.

A method for transmitting a point-to-multipoint service from a network of a mobile communication system, comprises transmitting scheduling information to a mobile terminal for discontinuously receiving point-to-multipoint service data, wherein the scheduling information is provided via a first common channel to a plurality of mobile terminals subscribing to the point-to-multipoint service and discontinuously transmitting the point-to-multipoint service data in the mobile terminal through a second common channel.

The first common channel and the second common channel are mapped onto a common physical channel, wherein the scheduling information comprises information associated with another common traffic logical channel mapped to the common physical channel. The scheduling information may further comprise information associated with another point-to-multipoint service data transmitted through the common physical channel. The first common channel comprises a common control logical channel. The second common channel comprises a common traffic logical channel.

In one embodiment of the invention, the scheduling information is transmitted periodically, wherein the network transmits period information for transmitting the scheduling information through a third common channel. Furthermore, the scheduling information is transmitted during discontinued transmission of the point-to-multipoint service data.

In another embodiment of the invention, the scheduling information is transmitted non-periodically, wherein the network transmits information related to when the next scheduling information is transmitted through the first common channel. Furthermore, the scheduling information is transmitted during discontinued transmission of the point-to-multipoint service data.

In one aspect of the invention, the scheduling information comprises information associated with discontinued transmission of the point-to-multipoint service data, wherein the network suspends transmitting the point-to-multipoint service data for a period associated with the scheduling information.

In another aspect of the invention, the scheduling information comprises information associated with continued transmission of the point-to-multipoint service data, wherein the network transmits the point-to-multipoint service data for a period associated with the scheduling information.

The scheduling information may further comprise information associated with a start time of the continued transmission of the point-to-multipoint service data, wherein the network transmits the point-to-multipoint service data from the start time for a period associated with the scheduling information.

In a further aspect of the invention, the scheduling information comprises a service identifier for identifying the point-to-multipoint service. The scheduling information may also comprise an identifier for identifying the second common channel. The second common channel is configured in response to information transmitted through a third common channel.

In a detailed aspect of the invention, the method comprises transmitting the scheduling information according to a scheduling information mode and transmitting a mode indicator for indicating the scheduling information mode, wherein scheduling information mode comprises at least one of transmitting the scheduling information once during discontinued transmission of the point-to-multipoint service data, transmitting the scheduling information periodically during discontinued transmission of the point-to multipoint service data, and transmitting the scheduling information non-periodically during discontinued transmission of the point-to-multipoint service data.

Preferably, the mode indicator is transmitted through at least one of the first common channel, a third common channel using a point-to-multipoint RRC message, and a fourth common channel using system information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The present invention is implemented in a mobile communication system, such as a UMTS (Universal Mobile Telecommunications System), which has been developed according to 3GPP specifications. However, the present invention can also be applied to a different communications system.

The present invention relates to discontinuously transmitting and receiving MBMS data between a network providing one or more MBMS services and a mobile terminal receiving a specific MBMS. For this purpose, the network system transmits an MBMS control message through a first physical channel, and transmits MBMS data and an MBMS control assist message (e.g. scheduling message) assisting the MBMS control message through a second physical channel, to thereby discontinuously transmit the MBMS data to the mobile terminal according to the MBMS control assist message.

The mobile terminal receives the MBMS control message through the first physical channel, receives the MBMS data and the MBMS control assist message assisting the MBMS control message through the second physical channel, and discontinuously receives the MBMS data from the network according to the control assist message.

The MBMS control assist message includes, for example, MBMS scheduling information for MBMS data transmitted through an MTCH and indicates the suspension or resumption of an MBMS transmission or reception. If the MBMS scheduling information included in the MBMS control assist message indicates suspension of the MBMS transmission or reception, the terminal suspends reception of the MBMS data. If the MBMS scheduling information indicates resumption of the MBMS transmission or reception, the terminal resumes reception of the MBMS data.

Furthermore, if the MBMS scheduling information of the MBMS control assist message indicates suspension of transmission or reception of the MBMS data, the MBMS scheduling information additionally transfers suspension time information to the terminal. Preferably, the suspension time information includes a time for when the terminal suspends reception of the MBMS data, a suspension period or a suspension offset for receiving the MBMS data.

The MBMS control message is transmitted through the logical channel MCCH. The MBMS data is transmitted through the logical channel MTCH. The first physical channel is preferably the physical channel SCCPCH to which the MCCH is mapped. The second physical channel is preferably the physical channel SCCPCH to which the logical channel MTCH is mapped.

The MBMS control assist message is transmitted through a second physical channel to which the logical channel MTCH is mapped. The MBMS control assist message is preferably transmitted through a logical channel different from the MCCH. Preferably, the MBMS control assist message includes scheduling information indicating a control message transmitted through the first physical channel.

Figure 1:
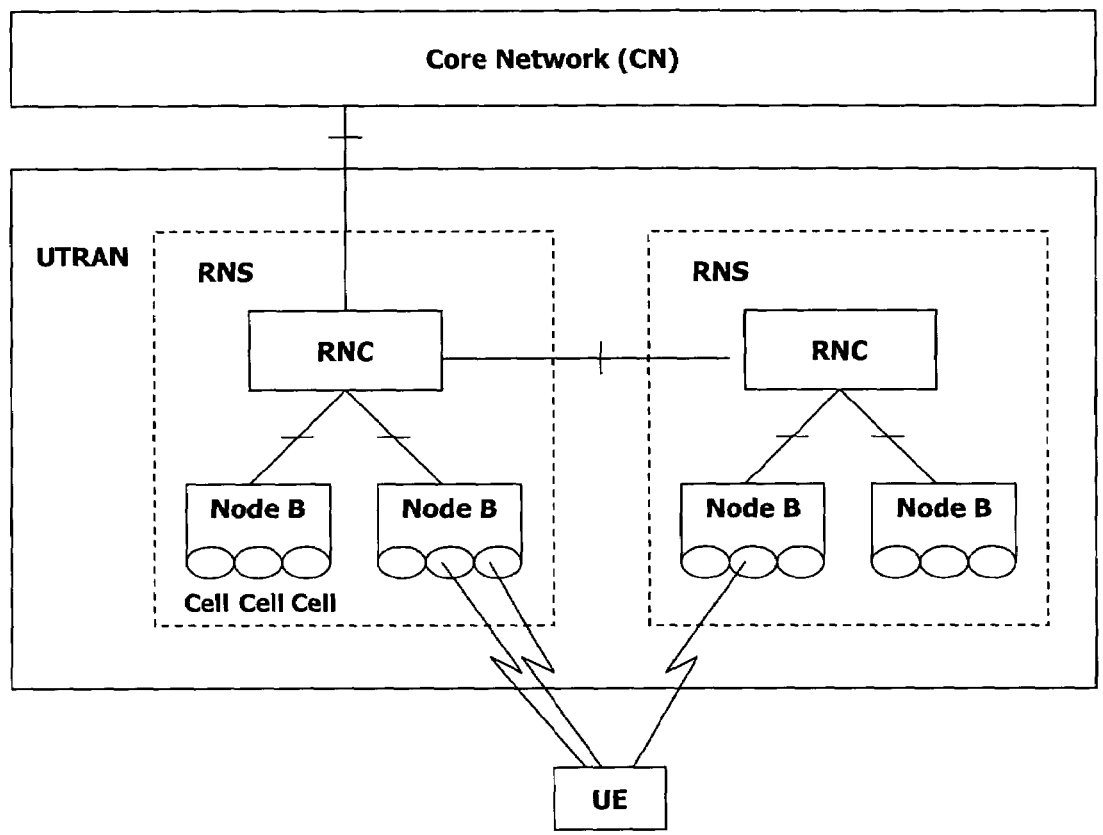
FIG. 1 illustrates a block diagram of a related art UMTS network structure.
Figure 2:
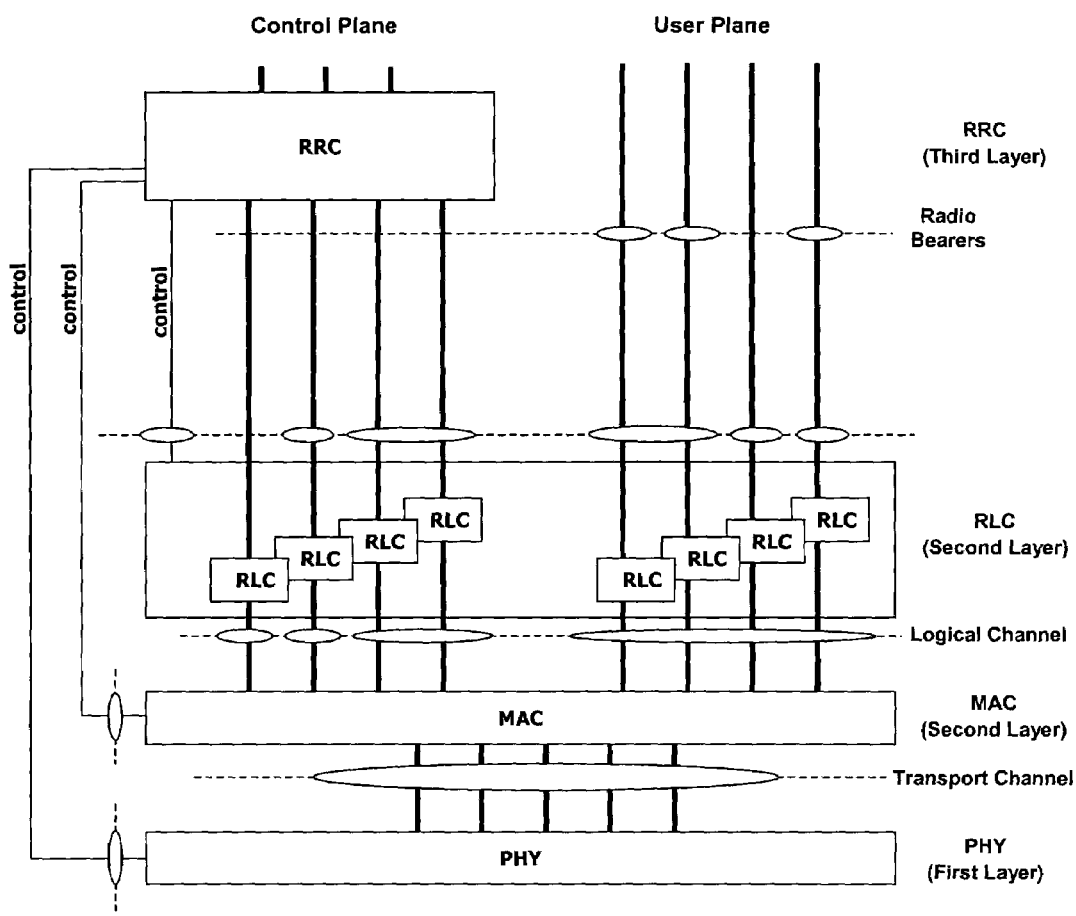
FIG. 2 illustrates a block diagram of a related art radio access interface protocol based on 3GPP radio access network specifications.
Figure 3:
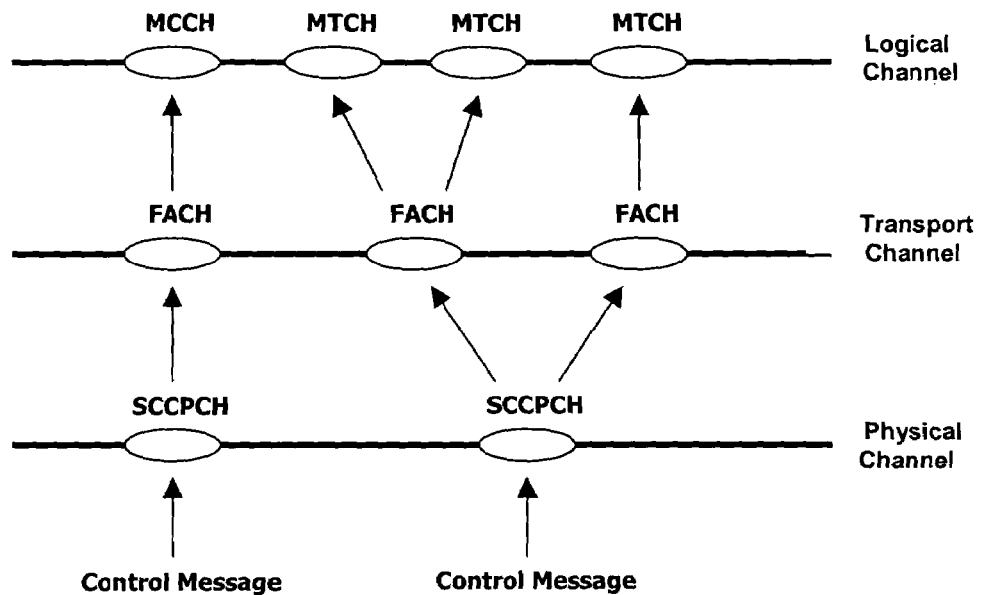
FIG. 3 illustrates a related art MBMS channel mapping structure.
Figure 4:
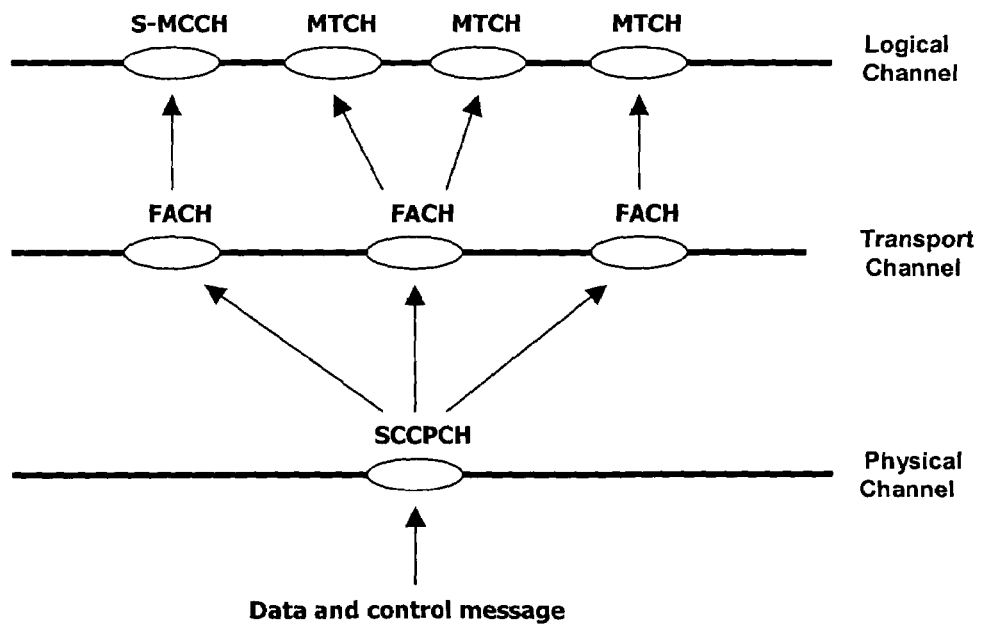
FIG. 4 illustrates an MBMS channel mapping structure in accordance with one embodiment of the invention.

FIG. 4 illustrates an MBMS channel mapping structure in accordance with a preferred embodiment of the present invention. As shown in FIG. 4, in order to discontinuously transmit and receive MBMS data, an S-MCCH (Secondary MCCH) assists the MCCH, wherein the S-MCCH is used to transmit the MBMS control assist message to the terminal. The logical channel S-MCCH is mapped to the transport channel FACH and the FACH is mapped to the physical channel SCCPCH. The S-MCCH is mapped to the same SCCPCH to which the MTCH is mapped. Preferably, the S-MCCH is always mapped to the same SCCPCH to which one or more MTCH are mapped. Furthermore, it is preferable that the S-MCCH not be mapped to the same SCCPCH to which the MCCH is mapped.

Only one MCCH exists per cell, but comparatively, the number of S-MCCHs existing per cell are as many as the number of SCCPCHs to which one or more MTCHs are mapped. Preferably, one or more S-MCCHs exist in one cell. Further, a protocol stack of the S-MCCH is the same as a protocol stack of the MCCH.

Referring to FIG. 4, one MTCH is used to transmit the MBMS data for a specific MBMS service. The S-MCCH transmits an MBMS control assist message related to the transmission and reception of the MTCH mapped to the same SCCPCH as the S-MCCH. The MBMS control assist message includes MBMS scheduling information for the MBMS data transmitted through the MTCH, e.g., a transmission/reception indicator. The MBMS scheduling information is used to inform terminals desiring to receive a specific MBMS to suspend or resume reception of the MBMS through a specific MTCH.

The MBMS control assist message transmitted through the S-MCCH may include MBMS scheduling information with an identifier for identifying a specific MTCH (MTCH identifier) or an identifier for identifying an MBMS transmitted through the MTCH (MBMS identifier). Accordingly, the MBMS scheduling information can control the transmission/reception of MBMS data transmitted through the MTCH by using the MTCH identifier or MBMS identifier.

Figure 5:
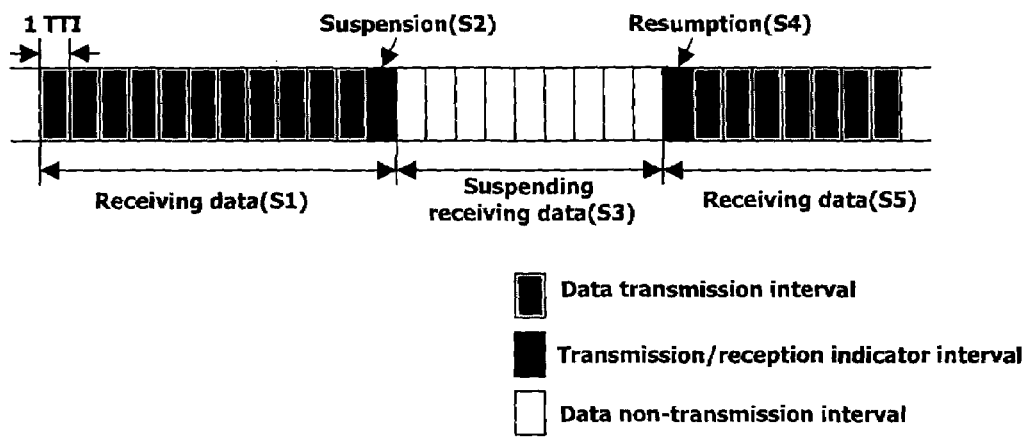
FIG. 5 illustrates a timeline for discontinuously transmitting and receiving MBMS data in a mobile communication system in accordance with one embodiment of the invention.
Figure 6:
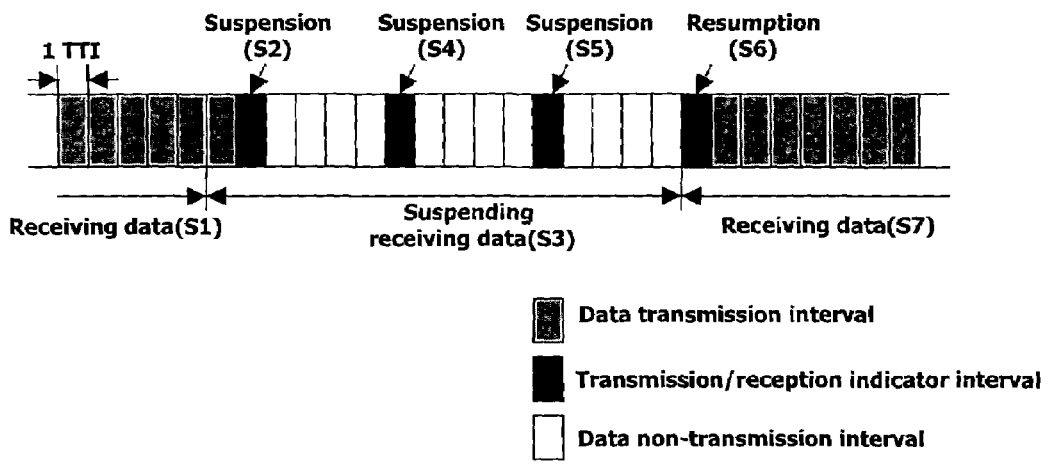
FIG. 6 illustrates a timeline for discontinuously transmitting and receiving MBMS data in a mobile communication system in accordance with another embodiment of the present invention.
Figure 7:
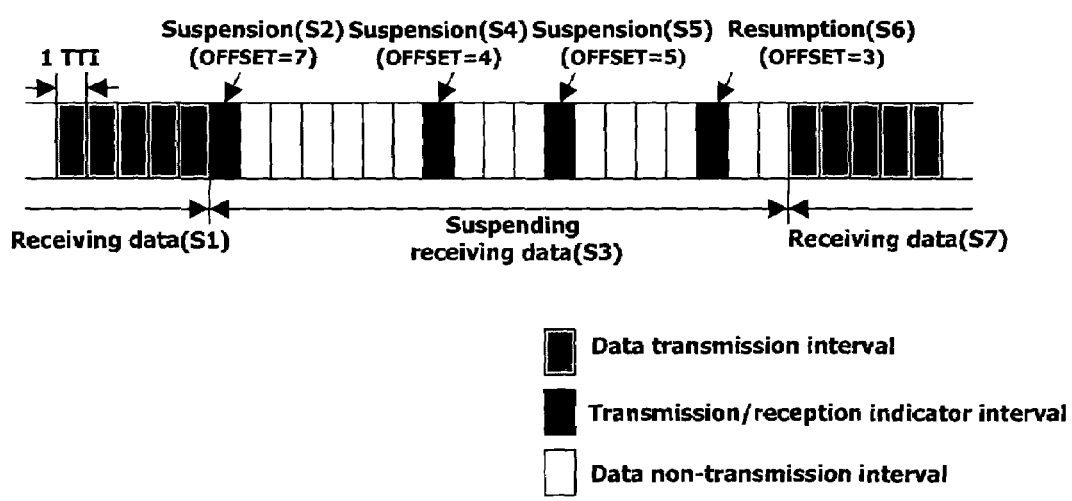
FIG. 7 illustrates a timeline for discontinuously transmitting and receiving MBMS data in a mobile communication system in accordance with a further embodiment of the invention.

The operation of discontinuously transmitting/receiving MBMS data in accordance with the present invention will now be described. Referring to FIGS. 5 to 7, a process is illustrated in which the UTRAN discontinuously transmits specific MBMS data in units of TTI (Transmission Time Interval) through the SCCPCH and the terminal discontinuously receives the specific MBMS data through the SCCPCH. Herein, the units of TTI can be set at 10 ms, 20 ms, 40 ms or 80 ms.

FIG. 5 illustrates a timeline for discontinuously transmitting/receiving MBMS data between the UTRAN and the terminal in accordance with a first embodiment of the present invention (mode 1). As shown in FIG. 5, the MBMS scheduling information indicating suspension is not repeatedly transmitted during a suspension interval (S3) of MBMS data reception.

First, the network (for example, the UTRAN) transmits data through an SCCPCH to which a specific MTCH for a specific MBMS is mapped. The data is transmitted in units of TTI (Transmission Time Interval). The terminal desiring to receive the MBMS receives the MBMS data through the SCCPCH (step S1).

If the data transmission is suspended for the specific MBMS service through the specific MTCH, the UTRAN transmits an MBMS control assist message including MBMS scheduling information indicating suspension and an MBMS identifier (or a MTCH identifier) through the S-MCCH (step S2).

The terminal receives the MBMS control assist message including the MBMS scheduling information indicating suspension and the MBMS identifier (or the MTCH identifier). The UTRAN may also include in the MBMS control assist message time information at which MBMS scheduling information indicating resumption of MBMS data transmission is transmitted. In this case, the terminal obtains from the MBMS control assist message the time information at which the MBMS scheduling information indicating resumption is transmitted.

Accordingly, the UTRAN suspends MBMS data transmission through the MTCH and the terminal suspends MBMS data reception through the MTCH according to the indication of the MBMS scheduling information included in the MBMS control assist message (step S3). During the data reception suspension interval, the terminal may perform various operations such as a measurement process according to an instruction of the UTRAN, receive the MCCH, or receive a paging indicator channel for an MBMS.

In step S2, if time information at which the MBMS scheduling information indicating resumption of the MBMS data transmission is to be transmitted is included in the MBMS control assist message, the terminal detects in the MBMS control assist message the time information at which the MBMS scheduling information indicating resumption is transmitted from the UTRAN.

If, however, the time information at which the MBMS scheduling information indicating resumption is to be transmitted is not included in the MBMS control assist message, the UTRAN transmits the time information at which the MBMS scheduling information is to be transmitted through the MCCH or the paging indicator channel during the data reception suspension interval.

Accordingly, the terminal can obtain the time information at which the MBMS scheduling information is to be transmitted and detect the time information at which the MBMS scheduling information indicating resumption of the MBMS data transmission is to be transmitted.

In this manner, the terminal can detect the time information at which the MBMS scheduling information indicating resumption is to be transmitted and suspend reception of the MBMS data through the SCCPCH to which the MTCH is mapped until the MBMS scheduling information indicating resumption is transmitted.

When the data transmission for the MBMS through the MTCH is resumed, the UTRAN transmits the MBMS control assist message including the MBMS scheduling information indicating resumption of the MBMS data transmission and the MBMS identifier (or the MTCH identifier) to the terminal (step S4). Then, the terminal receives the MBMS control assist message and obtains the MBMS scheduling information indicating resumption of the MBMS data transmission and the MBMS identifier (or the MTCH identifier).

If there is a time difference between the point at which the MBMS scheduling information indicating resumption is transmitted and the point at which MBMS data transmission through the MTCH is resumed, the UTRAN also includes information regarding an MTCH data transmission resumption point in the MBMS control assist message. The terminal obtains the information regarding the MTCH data transmission resumption point from the MBMS control assist message.

Accordingly, the UTRAN resumes the data transmission for the MBMS through the MTCH and the terminal resumes receiving the MBMS data through the MTCH according to the indication of the MBMS scheduling information indicating resumption (step S5).

In this case, if the received MBMS control assist message includes the information regarding the MTCH data transmission resumption point, the terminal starts receiving the MBMS data through the MTCH from the MTCH data transmission resumption point. If, however, the MBMS control assist message does not include the information regarding the MTCH data transmission resumption point, the terminal starts receiving the MBMS data through the MTCH immediately after receiving the MBMS control assist message including the MBMS scheduling information indicating resumption.

FIG. 6 illustrates a timeline for discontinuously transmitting/receiving MBMS data between the UTRAN and the terminal in accordance with a second embodiment of the present invention (mode 2). As shown in FIG. 6, the MBMS control assist message including the MBMS scheduling information is periodically transmitted during the suspension interval of the data reception. For this purpose, the UTRAN should inform the terminal about a transmission cycle of the MBMS scheduling information that is periodically transmitted during the suspension interval of the data reception. The transmission cycle information of the MBMS scheduling information includes a cycle length with which the MBMS scheduling information is repeatedly transmitted during the suspension interval of the data reception. The cycle length refers to a time interval between two successive MBMS scheduling information transmissions. In FIG. 6, the cycle length is equal to 5 TTI; i.e., five times a TTI length.

Referring to FIG. 6, the process of transmitting and receiving the MBMS data between the UTRAN and the terminal is as follows. The UTRAN transmits specific MBMS data through the SCCPCH to which a specific MTCH is mapped in units of TTI. The terminal that desires to receive the MBMS, receives the MBMS data through the SCCPCH to which the MTCH is mapped (step S1).

If the MBMS data transmission through the MTCH is intended to be suspended, the UTRAN transmits an MBMS control assist message including MBMS scheduling information indicating suspension of the MBMS data transmission and the MBMS identifier (or MTCH identifier) through the S-MCCH (step S2). Here, the UTRAN also includes the transmission cycle information of the MBMS scheduling information in the MBMS control assist message. Then, the terminal receives the MBMS control assist message and obtains the MBMS scheduling information indicating suspension of the MBMS data transmission and the MBMS identifier (or MTCH identifier). In this case, the terminal obtains the transmission cycle information of the MBMS scheduling information from the MBMS control assist message.

The UTRAN suspends MBMS data transmission through the MTCH and the terminal suspends MBMS data reception through the MTCH according to the indication of the MBMS scheduling information included in the MBMS control assist message (step S3). During the suspension interval of the data reception, the terminal can perform various operations such as a measurement process according to an instruction of the UTRAN, receive the MCCH, or receive a paging indicator channel for an MBMS.

The UTRAN periodically transmits the MBMS control assist message including the MBMS scheduling information through the S-MCCH during the suspension interval of the data reception (step S4). If the transmission cycle information of the MBMS scheduling information is included in the MBMS control assist message in the step S2, the terminal obtains the transmission cycle information of the MBMS scheduling information from the MBMS control assist message and detects a point at which the MBMS scheduling information is periodically transmitted.

If, however, the transmission cycle of the MBMS scheduling information is not included in the MBMS control assist message, the terminal receives the transmission cycle information of the MBMS scheduling information through the BCCH or the MCCH before performing the step S4.

After obtaining a point at which the MBMS scheduling information is periodically transmitted, the terminal suspends reception of the MBMS data through the MTCH and receives the MBMS scheduling information through the S-MCCH periodically.

In addition, during the suspension interval of the data reception, the UTRAN periodically transmits the MBMS scheduling information through the S-MCCH (step S5). Meanwhile, the terminal suspends MBMS data reception through the MTCH and periodically receives the MBMS scheduling information through the S-MCCH by using the transmission cycle information of the MBMS scheduling information obtained in the step S4.

Thereafter, when the MBMS data transmission through the MTCH is to be resumed, the UTRAN sets the MBMS scheduling information to indicate resumption of the MBMS data transmission and transmits an MBMS control assist message including the MBMS scheduling information indicating resumption and the MBMS identifier (or the MTCH identifier) to the terminal through the S-MCCH (step S6).

If there is a time difference between the point at which the MBMS scheduling information indicating resumption is transmitted and the point at which data transmission of the MBMS through the MTCH is resumed, the UTRAN also includes information regarding an MTCH data transmission resumption point in the MBMS control assist message. The terminal obtains the information regarding the MTCH data transmission resumption point from the MBMS control assist message.

Accordingly, the UTRAN resumes data transmission of the MBMS through the MTCH and the terminal resumes reception of the MBMS data through the MTCH according to the indication of the control assist message including the MBMS scheduling information indicating resumption of the MBMS data transmission that has been received in the step S6 (step S7).

If the MBMS control assist message received in the step S6 includes the information regarding the MTCH data transmission resumption point, the terminal starts receiving the MBMS data through the MTCH from the MTCH data transmission resumption point as indicated by the information. If, however, the MBMS control assist message received in the step S6 does not include information regarding the MTCH data transmission resumption point, the terminal starts receiving the MBMS data through the MTCH immediately after receiving the MBMS control assist message including the MBMS scheduling information indicating resumption.

FIG. 7 illustrates a method of discontinuously transmitting/receiving MBMS data between the UTRAN and the terminal in accordance with a third embodiment of the present invention (mode 3). As shown in FIG. 7, the MBMS control assist message including the MBMS scheduling information is non-periodically transmitted during the suspension interval of the data reception. For this purpose, if the MBMS control assist message transmitted during the suspension interval of the data reception includes the MBMS scheduling information, the UTRAN also includes transmission point information regarding the next MBMS scheduling information transmission transmitted in a corresponding MBMS control assist message.

Preferably, the MBMS control assist message including the MBMS scheduling information includes transmission point information of the MBMS scheduling information to be transmitted next. Preferably, the transmission point information of the MBMS scheduling information to be transmitted next includes time difference (offset) information between a transmission point of the MBMS control assist message including the MBMS scheduling information being currently transmitted and a transmission point of the MBMS control assist message including the MBMS scheduling information to be transmitted next.

For example, in the step S2 of FIG. 7, the MBMS control assist message including the MBMS scheduling information indicating suspension of the MBMS data transmission includes an offset value of 7. The offset value is the time difference between the transmission point of the MBMS scheduling information in the step S2 and the transmission point of the MBMS scheduling information in the step S4.

In this manner, the MBMS control assist message including the MBMS scheduling information indicating suspension transmitted in the step S4 includes an offset value of 4. The offset value indicates the time difference between the transmission point of the MBMS scheduling information in the step S4 and the transmission point of the MBMS scheduling information in the step S5.

In the same manner, the MBMS control assist message including the MBMS scheduling information indicating suspension transmitted in the step S5 includes an offset value of 5, wherein the offset value indicates the time difference between the transmission point of the MBMS scheduling information in the step S5 and the transmission point of the MBMS scheduling information in the step S6.

Such a method can be also applied to a MBMS control assist message including MBMS scheduling information indicating resumption of the MBMS data transmission. The MBMS control assist message including the MBMS scheduling information indicating resumption transmitted in the step S6 of FIG. 7 includes an offset value of 3. The offset value indicates the time difference between the transmission point of the MBMS scheduling information in the step S6 and the resumption point of the data transmission of the MBMS through the MTCH that follows immediately.

The process of transmitting/receiving specific MBMS data between the UTRAN and the terminal will now be described. The UTRAN transmits the MBMS data through a specific SCCPCH to which a specific MTCH is mapped in units of TTI. The terminal that desires to receive the MBMS, receives the MBMS data through the SCCPCH to which the MTCH is mapped (step S1).

If the data transmission for the MBMS through the MTCH is to be suspended during the data transmission, the UTRAN transmits an MBMS control assist message including MBMS scheduling information indicating suspension of the MBMS data transmission, an MBMS identifier (or a MTCH identifier) and an offset value through the S-MCCH (step S2). Here, the offset value is equal to 7. The terminal receives the MBMS control assist message and obtains the MBMS scheduling information indicating suspension, the MBMS identifier (or the MTCH identifier) and the offset value.

Thereafter, the UTRAN suspends the data transmission of the MBMS data through the MTCH and the terminal suspends receiving the MBMS data through the MTCH according to the indication of the MBMS scheduling information included in the MBMS control assist message (step S3). During the suspension interval of the data reception, the terminal may perform various operations such as a measurement process according to an instruction of the UTRAN, receive the MCCH, or receive a paging indicator channel for an MBMS.

The UTRAN transmits the next MBMS control assist message including the MBMS scheduling information, the MBMS service identifier (or the MTCH identifier) and the offset value through the S-MCCH during the suspension interval (step S4). The terminal detects the next transmission point of the MBMS control assist message including the MBMS scheduling information by using the offset value (offset=7) obtained in the previous step S2, and receives the corresponding MBMS control assist message at the indicated transmission point.

Preferably, since the offset value obtained by the terminal in the step S2 is 7, the terminal suspends reception of the SCCPCH to which the specific MTCH is mapped during 6 TTIs. After the seventh TTI, the terminal receives the MBMS control assist message including the MBMS scheduling information of the current step S4. In addition, the terminal also obtains a new offset value (offset=4) included in the MBMS control assist message received in the current step S4.

The UTRAN then transmits the next MBMS control assist message including the MBMS scheduling information, the MBMS identifier (or the MTCH identifier) and an offset value through the S-MCCH during the suspension interval of the data reception (step S5). In this case, the terminal receives the MBMS control assist message including the MBMS scheduling information being currently transmitted according to the new offset value (offset=4) obtained in the previous step S4. The terminal also obtains the new offset value (offset=5) included in the MBMS control assist message received in the current step S5.

Thereafter, if data transmission of the MBMS through the MTCH is to be resumed, the UTRAN sets the MBMS scheduling information to indicate the resumption of the MBMS data transmission and then transmits the MBMS control assist message including the corresponding MBMS scheduling information and the MBMS identifier (or the MTCH identifier) to the terminal through the S-MCCH (step S6).

If there is a time interval between the point at which the MBMS scheduling information indicating resumption is transmitted and the point at which the MBMS data transmission through the MTCH is resumed, the UTRAN also includes in the MBMS control assist message information relating to an MTCH data transmission resumption point, such as an offset value. In this case, the terminal obtains the information regarding the MTCH data transmission resumption point, namely, the offset value, from the MBMS control assist message. Here, the offset has a value of 3.

Accordingly, the UTRAN resumes the data transmission of the MBMS through the MTCH and the terminal resumes receiving the MBMS data through the MTCH according to the indication of the MBMS control assist message including the MBMS scheduling information indicating resumption as received in the step S6 (step S7).

If the MBMS control assist message received in the step S6 includes the information regarding the MTCH data transmission resumption point, namely, the offset value (offset=3), the terminal starts receiving the MBMS data through the MTCH from the MTCH data transmission resumption point indicated by the offset.

For example, as shown in FIG. 7, when the offset value is equal to 3, the terminal receives the MBMS control assist message including the MBMS scheduling information indicating resumption and the MTCH data transmission resumption point at the step S6. The terminal then resumes receiving the MBMS data through the MTCH after suspending reception during 2 TTIs.

If the MBMS control assist message received in the step S6 does not include the information regarding the MTCH data transmission resumption point, the terminal resumes receiving the MBMS data through the MTCH immediately after receiving the MBMS control assist message including the MBMS scheduling information indicating resumption.

In the present invention, for the sake of explanation, three types of discontinuous transmission/reception methods have been described in three different embodiments (modes). The three types of discontinuous transmission/reception methods can be selectively used, for which the UTRAN should transmit information regarding the selected embodiment (mode) to the terminal. Namely, the UTRAN may transmit a mode indicator to the terminal.

The UTRAN transmits the mode indicator and the terminal operates during the suspension interval of the data reception according to a mode indicated by the received mode indicator. The operations of the terminal according to each mode have been described with reference to FIGS. 5 to 7.

The UTRAN can transmit the mode indicator to the terminal through various logical channels. First, a UTRAN RRC can transmit the mode indicator to a terminal RRC by using system information through the BCCH. Second, the UTRAN RRC can transmit the mode indicator to the terminal RRC by using an MBMS RRC message through the MCCH. Third, the UTRAN RRC can transmit the mode indicator to the terminal RRC through the S-MCCH.

Preferably, when the mode indicator is transmitted to the terminal through the S-MCCH, the UTRAN RRC transmits the mode indicator to the terminal RRC using the MBMS control assist message including the MBMS scheduling information indicating suspension of the MBMS data transmission. Specifically, the UTRAN RRC transmits the mode indicator to the terminal RRC by using the MBMS control assist message including the MBMS scheduling information indicating suspension most adjacent to the MTCH data transmission. Namely, the UTRAN RRC uses the MBMS control assist message including the MBMS scheduling information indicating suspension in the step S2 of FIGS. 5 to 7.

For example, in the step S2 of FIGS. 5 to 7, the UTRAN includes the mode indicator in the MBMS control assist message including the MBMS scheduling information indicating suspension and then transmits it to the terminal. Accordingly, the terminal receives the MBMS control assist message including the mode indicator and then operates during the suspension interval of the data reception according to a mode indicated by the corresponding mode indicator.

As so far described, the method for discontinuously receiving the MBMS data in accordance with the present invention has many advantages. For example, a wireless system transmits an MBMS control assist message through a physical channel transmitting MBMS data and transmits MBMS data discontinuously using the MBMS control assist message. A mobile terminal receives the MBMS control assist message through the physical channel and then receives the MBMS data discontinuously according to the MBMS control assist message.

Therefore, the mobile terminal can receive the MBMS data or perform measurement operations effectively. Namely, the terminal can easily perform a measurement operation while the MBMS service is being provided. Thus, the problem of the related art wherein the terminal cannot receive the MBMS data while the measurement operation is performed is solved.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage media (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving a point-to-multipoint service in a mobile terminal of a mobile communication system, the method comprising:
receiving scheduling information from a network for discontinuously receiving point-to-multipoint service data, wherein the scheduling information is provided via a first common channel to a plurality of mobile terminals subscribing to the point-to-multipoint service;
determining a time for receiving the point-to-multipoint service data in response to the scheduling information; and
discontinuously receiving the point-to-multipoint service data in the mobile terminal through a second common channel,
wherein the scheduling information comprises a service identifier for identifying the point-to-multipoint service,
wherein the first common channel carries the scheduling information and the second common channel carries the service data that are mapped to the same physical channel, and
wherein the first common channel is a Secondary MBMS Control Channel (S-MCCH), the second common channel is a MBMS Traffic Channel, and the physical channel is a Secondary Common Control Physical Channel (SCCPCH).

2. The method of claim 1, wherein the first common channel and the second common channel are mapped onto a common physical channel.

3. The method of claim 2, wherein the scheduling information comprises information associated with another common traffic logical channel mapped to the common physical channel.

4. The method of claim 2, wherein the scheduling information comprises information associated with another point-to-multipoint service data transmitted through the common physical channel.

5. The method of claim 1, wherein the first common channel comprises a common control logical channel.

6. The method of claim 1, wherein the second common channel comprises a common traffic logical channel.

7. The method of claim 1, wherein the scheduling information is received periodically.

8. The method of claim 7, wherein the mobile terminal receives period information for receiving the scheduling information through a third common channel.

9. The method of claim 7, wherein the scheduling information is received during discontinued transmission of the point-to-multipoint service data.

10. The method of claim 1, wherein the scheduling information is received non-periodically.

11. The method of claim 10, wherein the mobile terminal receives information related to when the next scheduling information is transmitted through the first common channel.

12. The method of claim 10, wherein the scheduling information is received during discontinued transmission of the point-to-multipoint service data.

13. The method of claim 1, wherein the scheduling information comprises information associated with discontinued transmission of the point-to-multipoint service data.

14. The method of claim 13, wherein the mobile terminal suspends receiving the point-to-multipoint service data for a period associated with the scheduling information.

15. The method of claim 1, wherein the scheduling information comprises information associated with continued transmission of the point-to-multipoint service data.

16. The method of claim 15, wherein the mobile terminal receives the point-to-multipoint service data for a period associated with the scheduling information.

17. The method of claim 1, wherein the scheduling information further comprises information associated with a start time of the continued transmission of the point-to-multipoint service data.

18. The method of claim 17, wherein the mobile terminal receives the point-to-multipoint service data from the start time for a period associated with the scheduling information.

19. The method of claim 1, wherein the scheduling information comprises an identifier for identifying the second common channel.

20. The method of claim 1, wherein the second common channel is configured in response to information transmitted through a third common channel.

21. The method of claim 1, wherein the scheduling information includes transmission point information of the scheduling information to be transmitted next.

22. The method of claim 21, wherein the transmission point information includes offset information between a transmission point of currently transmitted scheduling information and a transmission point of the scheduling information to be transmitted next.

23. A method for receiving a point-to-multipoint service in a mobile terminal of a mobile communication system, the method comprising:
receiving a mode indicator for indicating a scheduling information mode, wherein the scheduling information mode comprises at least one of receiving scheduling information once, receiving the scheduling information periodically during discontinued reception of point-to multipoint service data, and receiving the scheduling information non-periodically during discontinued reception of the point-to-multipoint service data;
receiving scheduling information from a network for discontinuously receiving the point-to-multipoint service data, wherein the scheduling information is provided via a first common channel to a plurality of mobile terminals;
determining a time for receiving the point-to-multipoint service data in response to the scheduling information; and
discontinuously receiving the point-to-multipoint service data in the mobile terminal through a second common channel.

24. The method of claim 23, wherein the mode indicator is received through at least one of:
the first common channel;
a third common channel using a point-to-multipoint RRC message; and
a fourth common channel using system information.

25. A method for transmitting a point-to-multipoint service from a network of a mobile communication system, the method comprising:
transmitting scheduling information to a mobile terminal for discontinuously receiving point-to-multipoint service data, wherein the scheduling information is provided via a first common channel to a plurality of mobile terminals subscribing to the point-to-multipoint service; and discontinuously transmitting the point-to-multipoint service data in the mobile terminal through a second common channel, wherein the scheduling information comprises a service identifier for identifying the point-to-multipoint service, wherein the first common channel carries the scheduling information and the second common channel carries the service data that are mapped to the same physical channel, and wherein the first common channel is a Secondary MBMS Control Channel (S-MCCH), the second common channel is a MBMS Traffic Channel, and the physical channel is a Secondary Common Control Physical Channel (SCCPCH).

26. The method of claim 25, wherein the first common channel and the second common channel are mapped onto a common physical channel.

27. The method of claim 26, wherein the scheduling information comprises information associated with another common traffic logical channel mapped to the common physical channel.

28. The method of claim 26, wherein the scheduling information comprises information associated with another point-to-multipoint service data transmitted through the common physical channel.

29. The method of claim 25, wherein the first common channel comprises a common control logical channel.

30. The method of claim 25, wherein the second common channel comprises a common traffic logical channel.

31. The method of claim 25, wherein the scheduling information is transmitted periodically.

32. The method of claim 31, wherein the network transmits period information for transmitting the scheduling information through a third common channel.

33. The method of claim 31, wherein the scheduling information is transmitted during discontinued transmission of the point-to-multipoint service data.

34. The method of claim 25, wherein the scheduling information is transmitted non-periodically.

35. The method of claim 34, wherein the network transmits information related to when the next scheduling information is transmitted through the first common channel.

36. The method of claim 34, wherein the scheduling information is transmitted during discontinued transmission of the point-to-multipoint service data.

37. The method of claim 25, wherein the scheduling information comprises information associated with discontinued transmission of the point-to-multipoint service data.

38. The method of claim 37, wherein the network suspends transmitting the point-to-multipoint service data for a period associated with the scheduling information.

39. The method of claim 25, wherein the scheduling information comprises information associated with continued transmission of the point-to-multipoint service data.

40. The method of claim 39, wherein the network transmits the point-to-multipoint service data for a period associated with the scheduling information.

41. The method of claim 25, wherein the scheduling information further comprises information associated with a start time of the continued transmission of the point-to-multipoint service data.

42. The method of claim 41, wherein the network transmits the point-to-multipoint service data from the start time for a period associated with the scheduling information.

43. The method of claim 25, wherein the scheduling information comprises an identifier for identifying the second common channel.

44. The method of claim 25, wherein the second common channel is configured in response to information transmitted through a third common channel.

45. The method of claim 25, wherein the scheduling information includes transmission point information of the scheduling information to be transmitted next.

46. The method of claim 45, wherein the transmission point information includes offset information between a transmission point of currently transmitted scheduling information and a transmission point of the scheduling information to be transmitted next.

47. A method for transmitting a point-to-multipoint service from a network of a mobile communication system, the system comprising:

transmitting a mode indicator for indicating a scheduling information mode;

wherein the scheduling information mode comprises at least one of:

transmitting the scheduling information once;

transmitting the scheduling information periodically during discontinued transmission of point-to multi-point service data;

transmitting the scheduling information non-periodically during discontinued transmission of the point-to-multipoint service data; and transmitting the scheduling information to a mobile terminal for discontinuously receiving point-to-multipoint service data, wherein the scheduling information is provided via a first common channel to a plurality of mobile terminals subscribing to the point-to-multipoint service; and discontinuously transmitting the point-to-multipoint service data in the mobile terminal through a second common channel.

48. The method of claim 47, wherein the mode indicator is transmitted through at least one of:

the first common channel;

a third common channel using a point-to-multipoint RRC message; and a fourth common channel using system information.

49. An apparatus for receiving a point-to multipoint service in a mobile terminal of a mobile communications system, the apparatus comprising:

a protocol entity adapted to receive scheduling information from a network for discontinuously receiving point-to-multipoint service data, wherein the scheduling information is provided via a first common channel to a plurality of mobile terminals subscribing to the point-to-multipoint service to determine a time for receiving the point-to-multipoint service data in response to the scheduling information, and to discontinuously receive the point-to-multipoint service data in the mobile terminal through a second common channel, wherein the scheduling information comprises a service identifier for identifying the point-to-multipoint service, wherein the first common channel carries the scheduling information and the second common channel carries the service data that are mapped to the same physical channel, and wherein the first common channel is a Secondary MBMS Control Channel (S-MCCH), the second common channel is a MBMS Traffic Channel, and the physical channel is a Secondary Common Control Physical Channel (SCCPCH).

50. An apparatus for transmitting a point-to-multipoint service from a network of a mobile communications system, the apparatus comprising:

a protocol entity adapted to transmit scheduling information to a mobile terminal for discontinuously receiving point-to-multipoint service data, wherein the scheduling information is provided via a first common channel to a plurality of mobile terminals subscribing to the point-to-multipoint service, wherein the point-to-multipoint service data is discontinuously transmitted to the mobile terminal through a second common channel, wherein the scheduling information comprises a service identifier for identifying the point-to-multipoint service, wherein the first common channel carries the scheduling information and the second common channel carries the service data that are mapped to the same physical channel, and wherein the first common channel is a Secondary MBMS Control Channel (S-MCCH), the second common channel is a MBMS Traffic Channel, and the physical channel is a Secondary Common Control Physical Channel (SCCPCH).

* * * * *